US011377308B2

(12) United States Patent
Bringewatt et al.

(10) Patent No.: US 11,377,308 B2
(45) Date of Patent: Jul. 5, 2022

(54) METHOD AND DEVICE FOR GRIPPING RECTANGULAR TEXTILE ITEMS AND/OR FOR FEEDING RECTANGULAR TEXTILE ITEMS TO A TREATMENT INSTALLATION

(71) Applicant: Herbert Kannegiesser GmbH, Vlotho (DE)

(72) Inventors: Wilhelm Bringewatt, Porta Westfalica (DE); Markus Nolte, Hille (DE); Engelbert Heinz, Vlotho (DE)

(73) Assignee: Herbert Kannegiesser GmbH, Vlotho (DE)

( * ) Notice: Subject to any disclaimer, the term of this patent is extended or adjusted under 35 U.S.C. 154(b) by 0 days.

(21) Appl. No.: 17/105,713

(22) Filed: Nov. 27, 2020

(65) Prior Publication Data

US 2021/0163237 A1 Jun. 3, 2021

(30) Foreign Application Priority Data

Nov. 28, 2019 (DE) .............................. 102019132377
Dec. 23, 2019 (DE) ............................. 102019135659

(51) Int. Cl.
*D06F 67/04* (2006.01)
*D06F 95/00* (2006.01)
*B65G 47/91* (2006.01)

(52) U.S. Cl.
CPC ............. *B65G 47/91* (2013.01); *D06F 95/00* (2013.01); *B65G 2201/022* (2013.01); *B65G 2203/0225* (2013.01); *B65G 2203/041* (2013.01)

(58) Field of Classification Search
CPC ........ D06F 67/104; D06F 95/00; B65G 47/91
(Continued)

(56) References Cited

U.S. PATENT DOCUMENTS 6,287,066 B1 * 9/2001 Heinz ..................... D06F 95/00
198/455
7,412,789 B2 * 8/2008 Jensen .................... D06F 95/00
38/143
(Continued)

FOREIGN PATENT DOCUMENTS

DE 3912977 A1 10/1990
DE 69526730 T2 1/2003
(Continued)

OTHER PUBLICATIONS

European Patent Office, Europaischer Recherchebericht (search in a related application), dated Apr. 8, 2021.
(Continued)

*Primary Examiner* — Douglas A Hess
(74) *Attorney, Agent, or Firm* — Laurence P. Colton; Smith Tempel Blaha LLC

(57) ABSTRACT

A method and device in which a respective laundry piece initially is automatically gripped at a location and pulled apart. The automatic gripping of laundry pieces for feeding to an infeed machine requires a plurality of handling procedures which for reliable automation have to be coordinated. The laundry piece is subsequently reoriented such that said laundry piece can be acquired in a manner which is favorable in terms of the subsequent steps, which can take place in front of a wall that stabilizes the laundry piece. Once the laundry piece has been gripped in the region of a periphery, the laundry piece, as a function of which periphery has been gripped and by way of which alignment the laundry piece is to be fed to the infeed machine, is pulled longitudinally or transversely onto a conveyor that transports said laundry piece to the infeed machine.

18 Claims, 9 Drawing Sheets

(58) Field of Classification Search
USPC .................................................. 38/7, 8, 143
See application file for complete search history.

(56) References Cited

U.S. PATENT DOCUMENTS

| | | | | |
|---|---|---|---|---|
| 8,028,444 | B2* | 10/2011 | Heinz | ..................... D06F 95/00 38/143 |
| 9,187,253 | B2* | 11/2015 | Olivieri | .................... D06F 67/04 |
| 9,657,434 | B2* | 5/2017 | Garrone | ................. D06F 67/10 |
| 9,988,220 | B2* | 6/2018 | Sielermann | ............. D06F 67/04 |
| 10,633,198 | B2* | 4/2020 | Bringewatt | ............ B65G 47/04 |
| 10,975,517 | B2* | 4/2021 | Nakamura | ................ D06C 3/00 |
| 2007/0068433 | A1* | 3/2007 | Nielsen | |

FOREIGN PATENT DOCUMENTS

| | | |
|---|---|---|
| DE | 102014017477 A1 | 6/2016 |
| DE | 102017005954 A1 | 12/2018 |
| EP | 0372320 A2 | 6/1990 |
| EP | 0751251 A1 | 1/1997 |
| EP | 1690976 A1 | 8/2006 |
| EP | 2930264 A1 | 10/2015 |
| EP | 3029195 A1 | 6/2016 |
| EP | 3421659 A1 | 1/2019 |
| JP | 2010273732 A | 12/2010 |
| JP | 2016106659 A | 6/2016 |
| WO | 2021001039 A1 | 1/2021 |
| WO | 2021034190 A1 | 2/2021 |

OTHER PUBLICATIONS

European Patent Office, Europaischer Recherchenbericht (search in a related application), dated Jul. 28, 2021.
European Patent Office, Europaischer Recherchenbericht (search in a related application), dated Jul. 20, 2021.
Deutsches Patent—Und Markenamt (German Patent and Trademark Office), Recherchebericht (search in a related application), dated Apr. 2, 2020.

* cited by examiner

METHOD AND DEVICE FOR GRIPPING RECTANGULAR TEXTILE ITEMS AND/OR FOR FEEDING RECTANGULAR TEXTILE ITEMS TO A TREATMENT INSTALLATION

CROSS REFERENCE TO RELATED APPLICATIONS

This application claims the benefit of and priority on German Patent Application No. 10 2019 132 377.0 having a filing date of 28 Nov. 2019 and German Patent Application No. 10 2019 135 659.8 having a filing date of 23 Dec. 2019.

BACKGROUND OF THE INVENTION

Technical Field

The invention relates to a method for gripping a rectangular textile item, wherein the singularized textile item is gripped at one corner, the textile item, while configuring regions in which the textile item overlaps so as to form double tiers, hangs freely from this corner, and the textile item by a holding means is reoriented so as to configure at least part of a free periphery of the textile item that emanates from the held corner, and to a method for gripping a rectangular textile item, wherein the textile item hanging from a clamp that holds a corner is reoriented so as to form at least part of a freely hanging periphery of the textile item that emanates from the held corner, respectively, and to a method for feeding rectangular textile items to a treatment installation. The invention furthermore relates to a device for gripping rectangular textile items, having a clamp for holding a corner of the textile item, and a clamp for acquiring a portion of at least part of a periphery of the textile item that hangs from the corner.

Prior Art

Textile items, in particular laundered laundry pieces and/or those to be laundered, having a rectangular shape have to be gripped such that said laundry pieces are able to be fed to a treatment installation. This applies to rectangular textile items which have mutually orthogonal peripheries of equal length as well as to those that have mutually orthogonal peripheries of unequal length.

The intention is to automatically grip rectangular textile items or to automatically feed the latter to treatment installations. To date, this has however been proven to be time-consuming and unreliable.

BRIEF SUMMARY OF THE INVENTION

The invention is based on the object of achieving a method and a device for rapidly and reliably gripping textile items automatically, which textile items thereafter are able to be automatically fed to treatment installations.

A method for achieving the object is a method for gripping a rectangular textile item, wherein the singularized textile item is gripped at one corner, the textile item, while configuring regions in which the textile item overlaps so as to form double tiers, hangs freely from this corner, and the textile item by a holding means is reoriented so as to configure at least part of a free periphery of the textile item that emanates from the held corner, wherein the textile item at a spacing from the held corner is pneumatically acquired by a holding means at a location, the textile item, while entraining the pneumatically acquired location, is initially pulled apart by the holding means, the textile item thereafter is gripped in a clamping manner at or in the proximity of the pneumatically acquired location, and the textile item by further displacing the holding means while maintaining the clamping hold is further pulled apart until at least part of a periphery of the textile item is configured below the held corner. Accordingly, it is provided for a textile item which is held at one corner or in a corner region and freely hangs from this corner to initially be pneumatically acquired or gripped, respectively, at a location that is spaced apart from this corner and, proceeding therefrom, to reorient the textile item in particular for a first time. The textile item is preferably pulled apart starting from the pneumatically gripped, preferably suctioned, location. Only one tier of the textile item in this case is held in a pneumatic, particularly suctioned, manner.

The pneumatic acquisition or gripping, respectively, of the textile item preferably takes place by suctioning with a vacuum. This preferred potential design embodiment also applies to the description hereunder, in particular also when only pneumatic acquiring or pneumatic holding is being discussed.

Once the pneumatically held, suctioned, textile item has been pneumatically gripped and/or suctioned for the first time, said textile item is mechanically gripped, for example, by a clamp or a gripper, respectively. The textile item is reoriented for a second time by displacing the clamp or the gripper, respectively. At least part of an edge is configured here such that the textile item can be automatically gripped at said edge such that said textile item is likewise able to be automatically fed to a treatment installation.

The method can preferably be refined such that the textile item at the location, or adjacent to the location, where the textile item is initially pneumatically acquired, preferably by a pneumatic suction head, so as to stretch said textile item in particular for removing creases, is firmly clamped in one tier by the holding means, in particular by at least one clamp of the latter. Only one tier of the laundry piece is thus pneumatically held so as to at least partially eliminate the crease by pulling said textile item apart and so that this one tier of the textile item can subsequently be acquired by clamps. On account thereof it is possible for the textile item to be pulled apart using a greater force and, on account thereof, to be freshly reoriented, specifically preferably to the extent that at least part of a preferably vertically hanging edge can be configured below the corner from which the textile item is hanging.

The pneumatic acquisition of the textile item takes place in particular by way of at least one suction head. The respective textile item is preferably suctioned by the suction head by way of only one tier. Should this suctioning take place at a location where the textile item has two tiers, or in the region of a crease where at least two tiers of the textile item lie on top of one another, only the one suctioned tier of the textile item, preferably the tier bearing on the suction head, is suctioned and thus held on the suction head. That tier of the textile item that is held by the suction head is entrained on account of the onward movement of the suction head and is reoriented on account thereof.

According to one preferred potential design embodiment of the method, the pneumatic acquisition of the textile item by the holding means take place below and/or obliquely below the held corner from which the textile item is hanging. The textile item typically hangs in creases from the held upper corner of said textile item. The creases can be pulled apart by pneumatically suctioning a tier of the textile item that points toward the holding means. On account thereof, a defined tier or layer of the textile item is configured at least at the location where the textile item is initially only pneumatically suctioned by the holding means.

It is furthermore conceivable that the textile item that is pneumatically held at the respective location is reoriented, preferably pulled apart, by laterally displacing the holding means while maintaining the pneumatic hold at the location, so that said textile item is configured with a single tier at least at the location thus held. This displacement preferably takes place on an oblique path which ascends in the displacing direction of the holding means. On account thereof, the at least one crease can be simply and reliably eliminated or pulled apart, respectively, at least to a sufficient extent, and the intended configuration of a that freely hangs from the held corner region or the held corner, or at least part of said periphery, is supported and/or facilitated.

After a single tier of the textile item has been pneumatically suctioned or fixed by suctioning, and the first reorientation of the textile item held by suctioning has taken place, renewed gripping of the textile item takes place. The textile item in the state still held by the suction head here is preferably gripped by a clamp or a gripper, respectively, and the suction head is thereafter released from the textile item by interrupting the supply of suction air to said suction head. The gripping takes place when by displacing the suction head that holds one tier by a predetermined distance the textile item is still reliably held in a pneumatic manner. This distance can be determined by an empirical method. It is also conceivable for the distance additionally to be individually established as a function of the size of the respective textile item. In this instance, it is detected beforehand by an image-generating installation, for example, how far below the freely hanging lower corner is spaced apart from the upper corner that for reorienting the textile item is held by a clamp. However, it is also conceivable for the suction head, or the mounting of the suction head on the holding installation, to be assigned a force transducer which determines the holding force of the suction head that increases when reorienting the textile item, and initiates the renewed gripping of the textile item when the specified holding force is reached.

It is preferably provided that the holding means, after the firm clamping of the single tier of the textile item that is configured by the prior pneumatic holding and/or suctioning, is further displaced until at least part of the periphery of the textile item that hangs from the held corner (or the corner region) has been configured. By firmly clamping a tier of the laundry piece in a targeted manner at the respective location, or in the proximity of the latter, preferably the location that has previously been pneumatically held and/or suctioned by a vacuum, the textile item can be reliably pulled apart to a sufficient extent by the clamp such that at least part of a freely hanging periphery can be configured on the textile item under any circumstances.

Once at least part of a periphery of the textile item has been configured below the held corner thereof or the held corner region, a portion of this periphery is gripped by a clamp. This here is preferably a double clamp having two spaced-apart clamps between which the peripheral portion, or at least part thereof, is fixed in a stretched manner, or an elongate clamp, the length thereof corresponding to the length of the portion of the periphery of the laundry piece to be gripped.

Once the portion of the periphery that freely hangs, preferably in a straight vertical line, from the held corner, or at least part of the periphery, has been acquired by the double clamp, or the wide or elongate clamp, respectively, the textile item of this clamp or double clamp, respectively, is pulled onto or over the conveyor for feeding the textile item to a treatment installation. This preferably takes place in such a manner that the textile item is pulled over the conveyor in an upside-down U-shaped configuration. To this end, the conveyor is narrower than the shorter periphery of the textile item. In this instance, opposite peripheral regions of the textile item hang from opposite sides of the conveyor, wherein an intervening inner portion, preferably a centric portion, of the textile item in this instance bears on the upper lead of the narrow conveyor.

A further method for achieving this object, this potentially also being a preferred refinement of the previously described method, is a method for gripping a rectangular textile item, wherein the textile item hanging from a clamp that holds a corner is reoriented so as to form at least part of a freely hanging periphery of the textile item that emanates from the held corner, wherein the textile item is reoriented from the held corner thereof in the state hanging in front of a wall by a holding means that acquires at least one location of the textile item, and displacing of said holding means so as to configure at least part of a periphery of the textile item hanging in front of the wall that emanates from the corner, and gripping of a portion of the periphery of the textile item hanging in front of the wall. Accordingly, it is provided that the respective textile item is placed so as to hang in front of a wall. The textile item in this case hangs in front of the wall so as to be held at a preferably upper corner. Proceeding from this state, the textile item is reoriented by a holding installation that acquires the textile item at one location. This is such a location of the textile item that is located so as to be adjacent to the holding installation. The textile item in front of the wall is then reoriented in such a manner that at least part of a periphery of the textile item hangs freely, preferably in a straight vertical line, or an at least approximately straight vertical line, from the held upper corner or corner region of said textile item.

A portion of the freely hanging periphery, or part of the periphery, of the textile item is gripped in a targeted manner. The textile item thus gripped can then be automatically fed to a processing installation, for example an infeed machine.

It is preferably provided that the textile item is reoriented in front of an upright, in particular vertical, wall and/or a portion of a freely hanging lateral periphery, or at least part of the latter, is gripped in front of this wall.

It is furthermore preferably provided that the wall is stationary or is at least stationary when the individual gripping procedures and the reorientation of the textile item in front of the wall take place.

In one preferred design embodiment of the method it is provided that the wall has a color, in particular a high-contrast color, which deviates from the color of the textile item. This permits more simply an image recognition of in each case one textile item in front of the wall that forms a contrast to said textile item.

The previously described method can be refined according to one or a plurality of the dependent claims.

A further method for achieving the object mentioned at the outset, wherein this can also be a preferred refinement of the previously described methods, is a method for feeding rectangular textile items to a treatment installation, wherein a respective singularized textile item is gripped at a portion of a periphery and pulled onto or over a conveyor of the treatment installation that transports the textile item to the treatment installation, wherein in the case of a textile item having peripheries of unequal length it is determined before or after gripping the portion of the periphery of the textile item whether this is a portion of a short or a long periphery, and as a function of the result of this determination, the textile item by way of the gripped portion of its periphery is pulled onto the conveyor in a targeted manner so as to be transverse or longitudinal on said conveyor. It is provided in this method that it is determined before or after gripping a portion of a periphery of the textile item whether the gripped periphery is a short or a long periphery, and as a function of the result of this determination, the textile item by way of the gripped portion of the periphery thereof is fed to the processing installation, preferably pulled onto a conveyor that transports the textile item to a treatment installation, in a targeted manner so as to be transverse or longitudinal on said conveyor.

For example, when the textile item is to be pulled onto the conveyor such that a short periphery runs transversely to the transporting direction and/or the longitudinal direction of the conveyor, an item that is acquired by way of a portion of the short periphery of said item is pulled onto the conveyor so as to be longitudinal in the transporting direction, while a textile item that is gripped by way of a portion of a long periphery is pulled transversely across the conveyor. If it is determined that the rectangular item is a square item having peripheries of equal length, this textile item can be pulled onto the conveyor in an arbitrary manner so as to be longitudinal or transverse thereon.

The method preferably operates using at least one image-generating installation. The respective textile item can be at least partially measured therewith. For example, it can be derived from an image of at least one relevant part of the textile item, preferably of the entire textile item, generated by the image-generating installation which periphery is the shorter or the longer periphery. It can likewise be determined whether both peripheries are of equal length or at least of almost equal length in the case of square textile items. The image data generated by the at least one image-generating installation can however also serve other or additional purposes, for example for moving in particular the clamp or the double clamp for acquiring a peripheral portion of the respective textile item in a targeted manner to the location of the periphery of which the portion is to be acquired.

Preferred refinements of the method relate to the claims.

A device for achieving the object mentioned at the outset is a device for gripping rectangular textile items, having a clamp for holding a corner of the textile item, and a clamp for acquiring a portion of at least part of a periphery of the textile item that hangs from the corner, wherein the clamp that holds the corner of the textile item is assigned a displaceable holding means for reorienting the textile item. Accordingly, the clamp that holds a corner, or a corner region, of the textile item from which the textile item freely hangs, is assigned a displaceable holding installation for reorienting the textile item. On account thereof it is possible to at least partially eliminate at least one such crease of the textile item, at the location of which crease the textile item is to be subsequently acquired. The displaceable holding installation however also serves for reorienting the textile item at least once such that at least part of a lateral periphery of the laundry piece is configured so as to freely hang below the clamp, in particular configured vertically or almost vertically and/or in a straight line or at least almost in a straight line. The textile item can be automatically gripped in a reliable manner, preferably controlled by image data of an image-generating installation, on a portion of this freely hanging periphery, or at least part of the latter.

The device is preferably refined such that the holding means is displaceable along an oblique path, and/or the clamp that holds the upper corner region of the textile item and from which the textile item by way of the upper corner thereof hangs, is displaceable on a vertical or almost vertical path. The respective textile item, independently of the shape and size thereof, can be reoriented at least once, preferably twice, or else more than twice, on these dissimilar paths such that said textile item can subsequently be simply and reliably gripped on a portion of the freely suspended periphery thereof, or part of the latter, that has been configured after the reorientation.

According to one advantageous potential refinement of the device it is provided that an end of the oblique path of the holding means that points to the vertical path of the clamp lies below the opposite end of the oblique path. On account thereof, the location of the textile item that is acquired by the holding means is moved onward in the vertical as well as the horizontal direction during the reorientation. This facilitates the most exact configuration possible of at least part of a periphery of the freely hanging textile item held by the clamp that is displaceable on the vertical path, said periphery emanating from the held upper corner.

It is preferably provided that the vertical path of the clamp holding the upper corner of the laundry piece, and the oblique path on which the holding means is displaceable, are disposed in front of or on or in, respectively, an upright, in particular vertical and/or stationary, wall from which the respective textile item hangs from the clamp and/or is able to be reoriented by the holding means. On account thereof, the respective textile item is supported by the wall and stabilized in front of the wall when being reoriented. This not only facilitates the gripping and/or renewed gripping of at least one location and/or at least one portion of a periphery of the textile item, but also the exact detection of the textile item by an image-generating installation that depicts the textile item in front of the wall.

According to one preferred design embodiment of the device, the at least one image-generating installation is assigned to the wall. This assigning preferably takes place in such a manner that the at least one image-generating installation is directed onto at least part of the textile item hanging in front of the wall, and/or at least such image data is able to be generated by the image-generating installation from which it can be derived whether a long periphery or a short periphery hangs from the clamp holding an upper corner region or an upper corner of the textile item, or whether both peripheries of the textile item are at least approximately of equal length. Rapid, reliable and exact automatic gripping of in particular rectangular textile items is enabled on account of this design embodiment of the device. The precondition completely automatically to feed textile items thus gripped either directly to a treatment installation for the textile items or likewise to a preferably narrow conveyor ahead of a treatment installation, preferably to pull and/or deposit said textile items onto said conveyor, is preferably achieved.

The single image-generating installation, or optionally also a separate image-generating installation, can also serve for determining the length of the laundry piece hanging from the held upper corner. This is preferably the spacing between diagonally opposite corners of the laundry piece, specifically between the held upper corner and the free lower corner that is situated at the lowest point of the hanging laundry piece. The approximate size of the laundry piece can be determined from the length of said laundry piece. Accordingly, it can be predefined how far the suction head of the holding means can be displaced along the oblique path to which the holding means is assigned, without there being the risk of the textile item that is held by suction being released from the suction head.

The image-generating installation can also serve in observing how the length of the periphery of the textile item that hangs from the held upper corner changes when said textile item is reoriented by the holding means, specifically by the suction head and the gripper thereof. The reorientation of the textile item can optionally also be terminated when the image-generating installation establishes that the hanging periphery that emanates from the held upper corner of the textile item has been configured to a sufficient length.

BRIEF DESCRIPTION OF THE DRAWINGS

A preferred exemplary embodiment of the invention will be explained in more detail hereunder by means of the drawing in which.

DETAILED DESCRIPTION OF PREFERRED EMBODIMENTS

The device shown in the figures and the method that can be carried out by said device serve for automatically gripping rectangular textile items and preferably also for automatically feeding such textile items to a treatment installation.

It is assumed in the description hereunder that the textile items are rectangular laundry pieces 10 which have been laundered and/or have yet to be laundered. The laundry pieces 10 preferably relate to so-called flat laundry pieces such as, for example, tablecloths, napkins, bedsheets, duvet covers and/or pillowcases. The rectangular laundry pieces 10 usually have peripheries of an equal length in that two parallel peripheries are larger than two parallel peripheries that run transversely to the former. The laundry pieces 10 can however also be square, having four peripheries of equal length. In the figures, the vertical peripheries are the longer peripheries. Said longer peripheries are referred to as longitudinal peripheries 11, while the horizontal peripheries are the shorter peripheries referred to as transverse peripheries 12.

Figure 1:
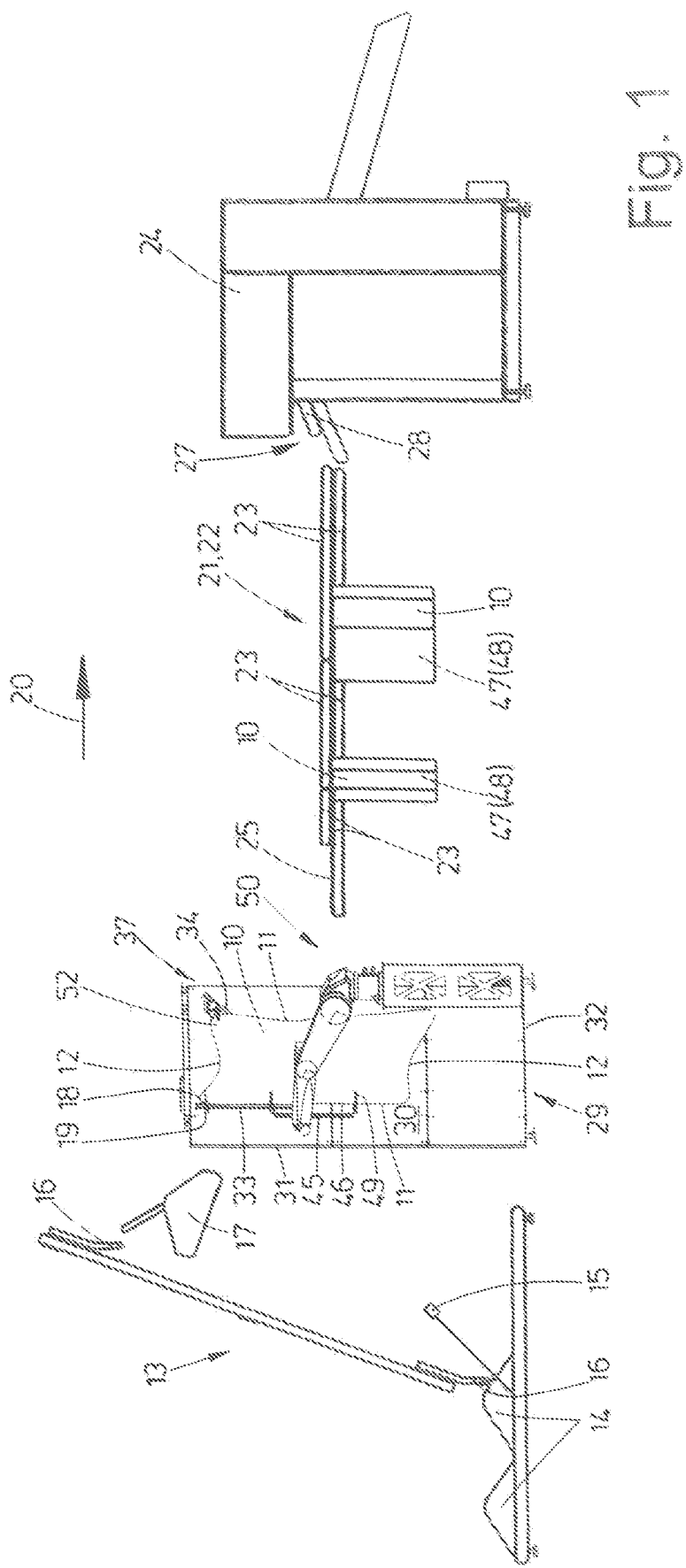
FIG. 1 shows a schematic view of the device with the installations upstream and downstream.
Figure 2:
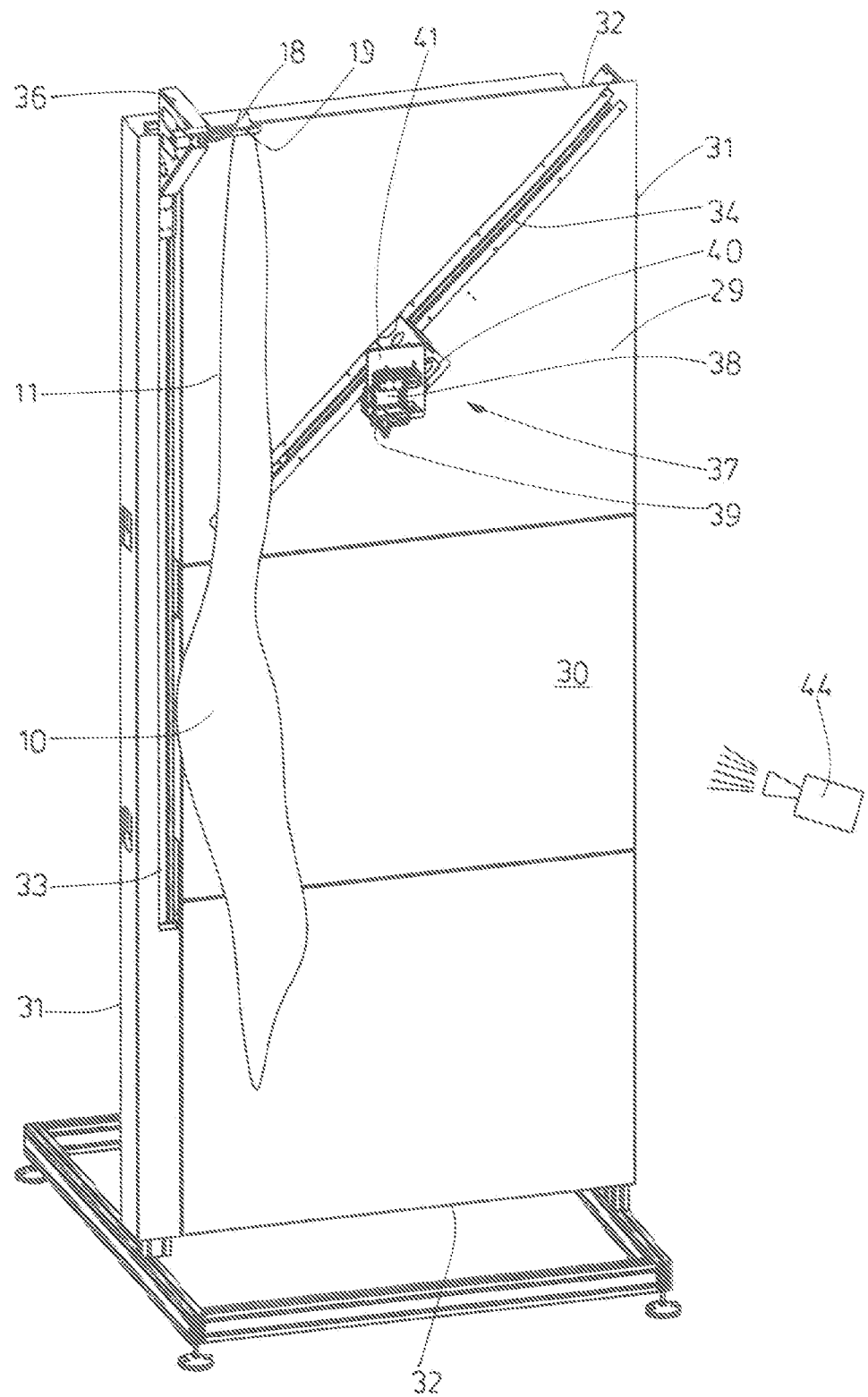
FIG. 2 shows a perspective view of only the device for automatically gripping rectangular textile items in an initial position.
Figure 3:
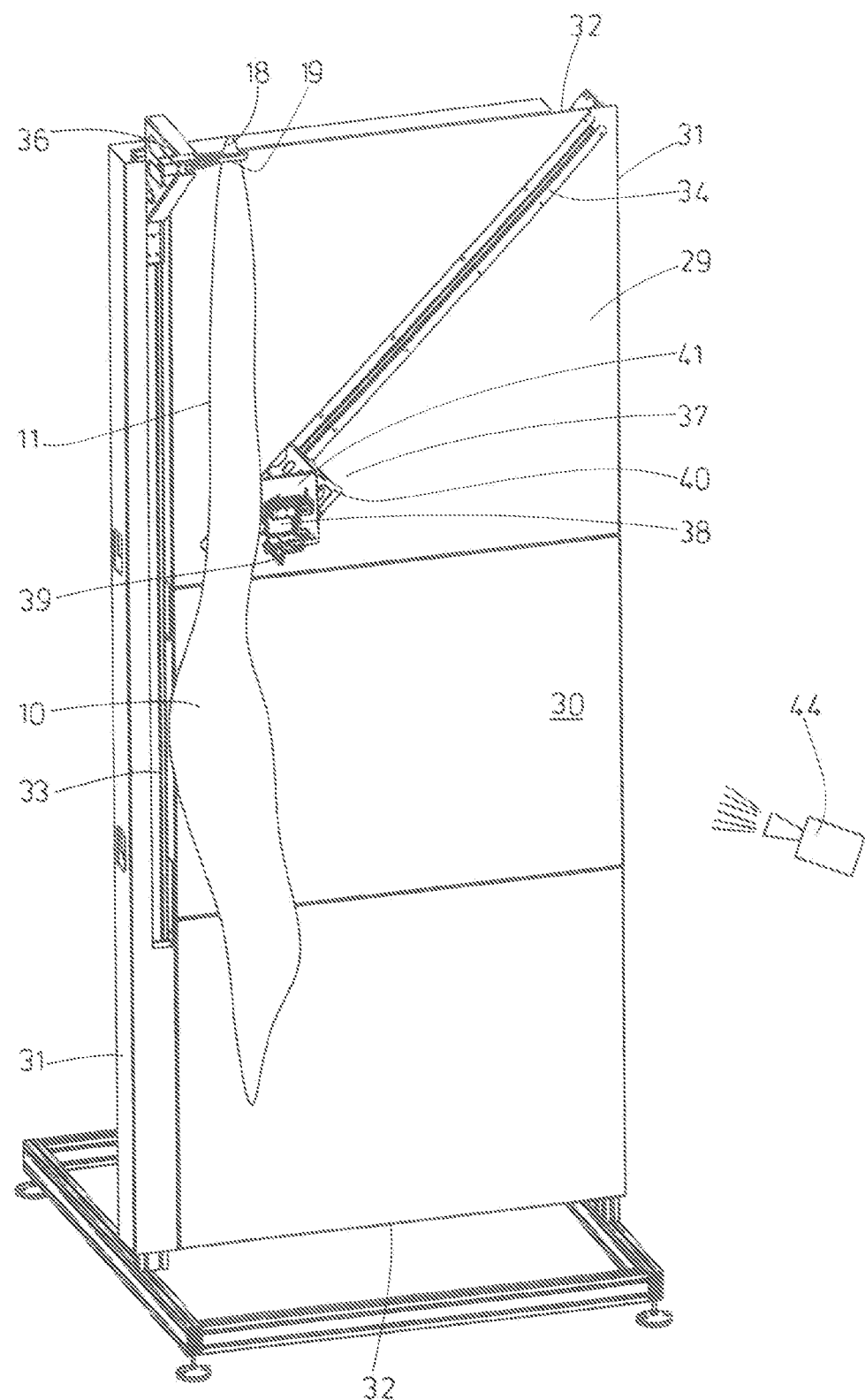
FIG. 3 shows a view analogous to that of FIG. 2 in an intermediate position of the device, in which a suction head has been moved to a textile item.
Figure 4:
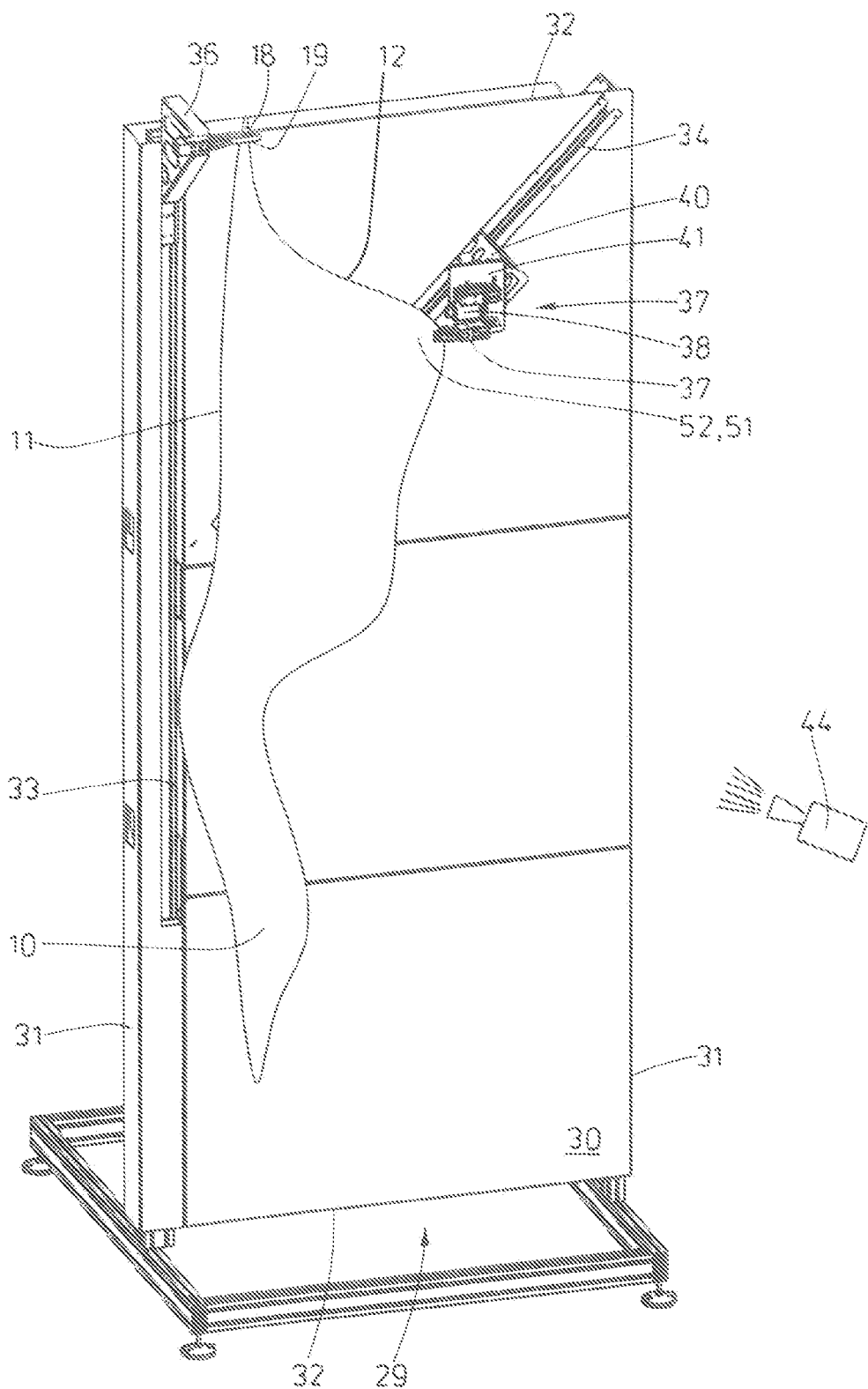
FIG. 4 shows a view analogous to that of FIGS. 2 and 3 in a further intermediate position of the device, in which the textile item has been acquired by a gripper.
Figure 5:
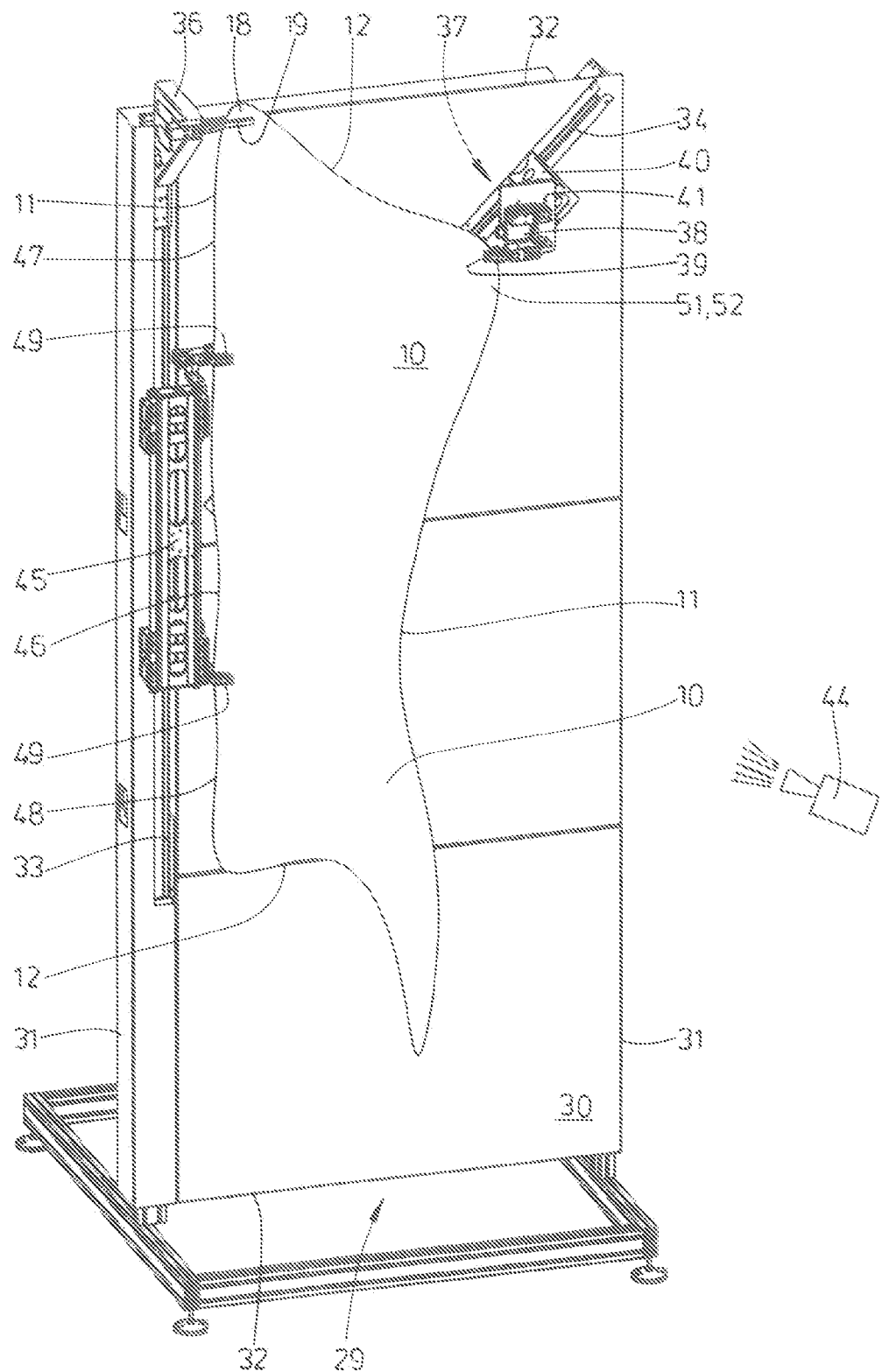
FIG. 5 shows an illustration of the device analogous to that of FIGS. 2 to 4 in a transfer position.
Figure 6:
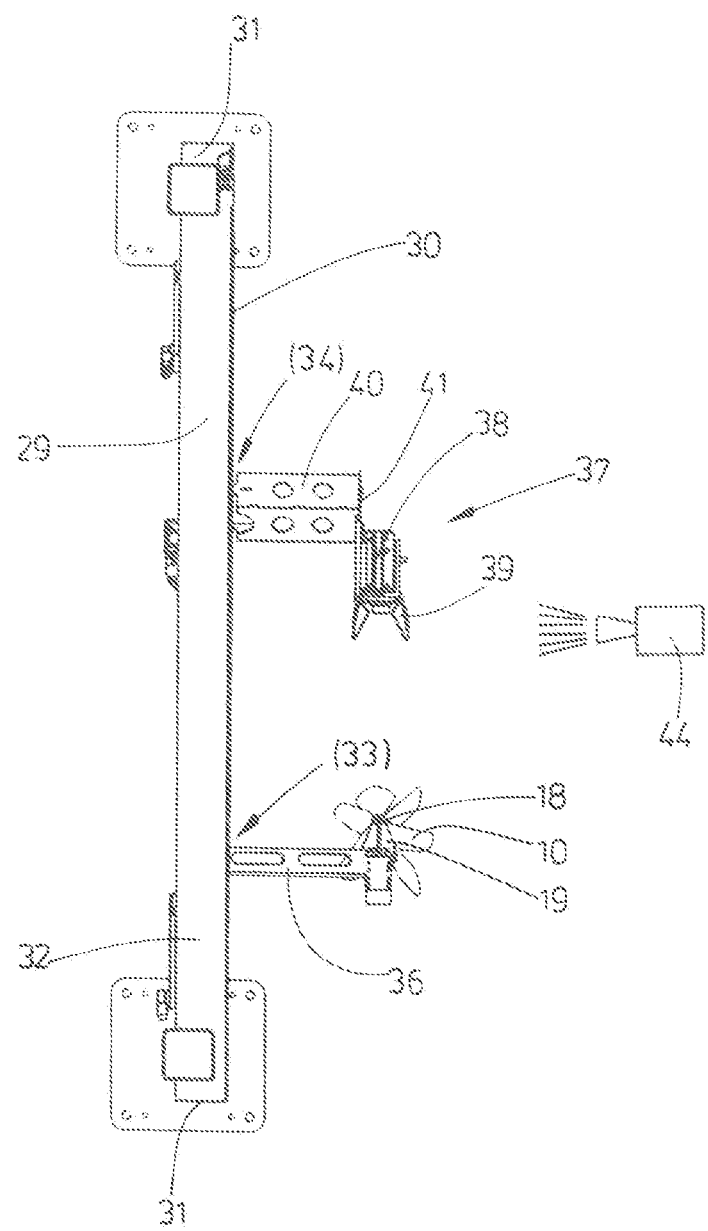
FIG. 6 shows a plan view of the device of FIG. 2.
Figure 7:
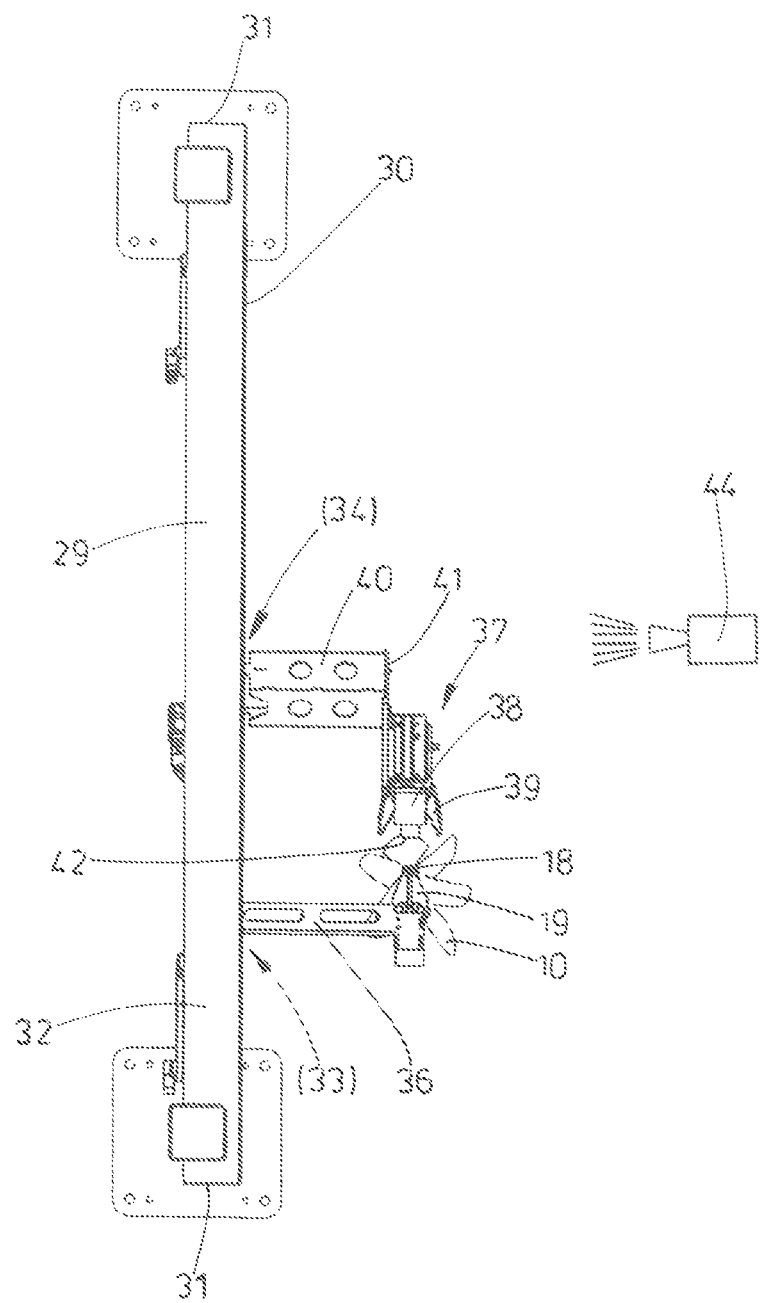
FIG. 7 shows a plan view of the device of FIG. 3.
Figure 8:
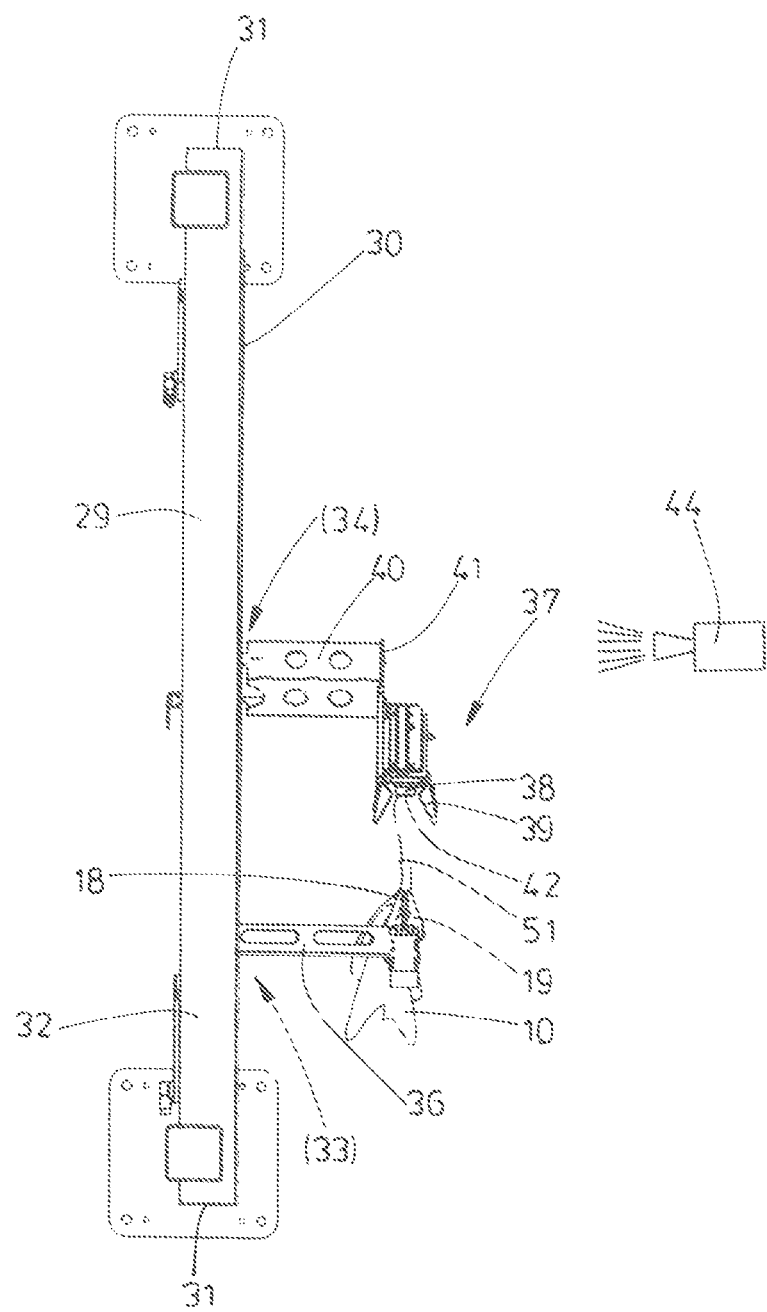
FIG. 8 shows a plan view of the device of FIG. 4 with a still opened clamp.
Figure 9:
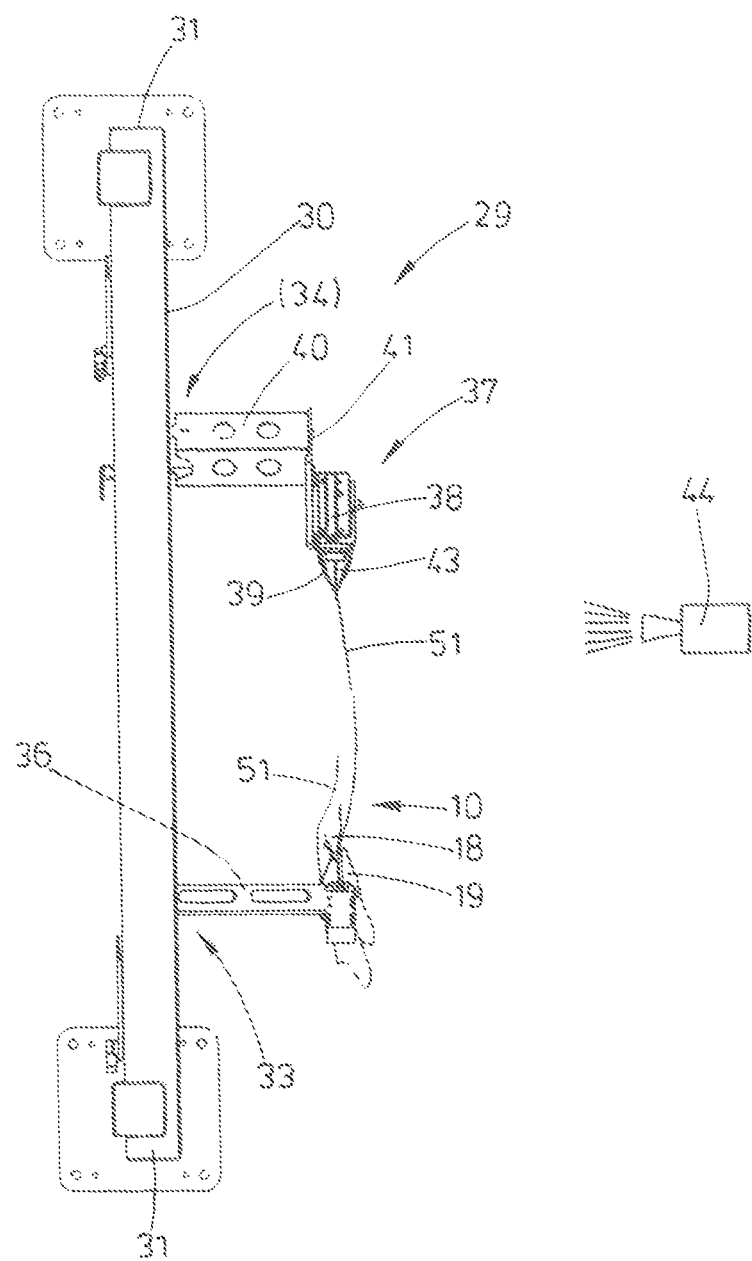
FIG. 9 shows a plan view of the device according to FIG. 5.

FIG. 1 schematically shows an automatically operating singularizer 13. The singularizer 13 in a self-acting and targeted manner preferably grips in each case one single laundry piece 10 from a laundry piece pile 14. The targeted automatic gripping of ideally a single laundry piece 10 takes place in the proximity of the laundry piece pile 14 so as to be supported by at least one camera 15 or any other image-generating installation. An image evaluation installation by means of the at least one recording of the camera 15 controls a gripper 16 of the automatic singularizer 13, said camera 15 being movable up and down along an incline. The gripper 16 transfers the preferably single laundry piece 10 gripped by said gripper 16 to a downstream preparatory installation 17 of the singularizer 13.

The preparatory installation 17 optionally carries out a final singularization of a plurality of laundry pieces 10 that have been simultaneously gripped by the gripper 16, and offers up the singularized (now single) laundry piece 10 for transferring a first corner 18. This transfer takes place by a clamp 19 of the device of the invention that is downstream in the transporting direction 20, specifically the flow direction of the laundry and/or the feeding direction. The clamp 19 can alternatively also grip a corner region of the corner 18. While only the corner 18 is mentioned in the description, this is intended to also include a corner region about the corner 18.

A conveyor 21 that transports the laundry pieces 10 onward follows the device in the transporting direction 20. The conveyor 21 in the exemplary embodiment shown is formed from a conveyor cascade 22. The conveyor cascade 22 is composed of a plurality of belt conveyors 23 which are arranged in directly successive pairs in the transporting direction 20 and disposed on top of one another in the manner of a sandwich. The laundry pieces 10 between these belt conveyors 23 disposed on top of one another, specifically the mutually facing leads thereof, are able to be transported in the transporting direction 20 along the conveyor cascade 22 to an infeed machine 24 which is downstream of said conveyor cascade 22. The initial pair of belt conveyors 23 of the conveyor cascade 22 that lie on top of one another is configured so as to be of dissimilar lengths. The lower belt conveyor 23 is longer than the upper belt conveyor 23 lying above the former. An exposed depositing region 25 for in each case one laundry piece 10 is created on account thereof at the beginning of the conveyor cascade 22 on the initial upper lead of the lower belt conveyor 23. The respective laundry piece 10, depending on the orientation thereof, is pulled onto the depositing region 25 in the transporting direction 20, or pulled transversely across the depositing region 25, whereupon the respective laundry piece 10 bears in an upside-down U-shaped configuration on the depositing region 25 at the beginning of the conveyor cascade 22. This U-shaped configuration of the laundry piece 10 placed on the depositing region 25 arises in that the belt conveyors 23 are configured so as to be relatively narrow, specifically have a width which, depending on the size of the laundry piece 10, corresponds to one tenth to five tenths of the width of said laundry piece 10. On account thereof, opposite outer peripheral regions of the laundry piece 10 in the region of the depositing region 25 hang down from opposite sides of the belt conveyor 23 so as to ideally, but not mandatorily, form legs of equal length of the laundry piece 10 of U-shaped configuration. A central, preferably centric, region of the laundry piece 10 which lies between the legs, or the outer peripheral regions, respectively, and connects the opposite legs in the manner of a web herein bears on the depositing region 25.

Upper and lower belt conveyors 23 of the conveyor cascade 22 that are successive in the transporting direction 20 are driven at mutually deviating transport speeds which in the transporting direction 20 increase in an identical manner, on account of which an elongation of the laundry piece 10 in the transporting direction 20 takes place when the respective laundry piece 10 runs through the conveyor cascade 22, i.e. in the onward transport of the laundry piece 10 in the transporting direction 20 along the conveyor 21, such that the respective laundry piece 10 in the transporting direction 20 at the end of the conveyor 21, i.e. at the last belt conveyor 23 of the conveyor cascade 22, lies so as to be at least for the most part stretched in an upside-down U-shaped manner over the last lower belt conveyor 23 of the conveyor cascade 22.

An alternative exemplary embodiment of the conveyor 21 in which the latter is not formed from a conveyor cascade 22 and/or no belt conveyors 23 are disposed on top of one another in the manner of a sandwich is also conceivable. The conveyor 21 in this instance in the simplest case is composed of a single continuous conveyor onto which the respective laundry piece 10 is placed or pulled, specifically preferably also in an upside-down U-shaped configuration. A plurality of comparatively short lower belt conveyors can optionally also be disposed in succession. Said lower conveyors can also have dissimilar transport speeds, preferably those which increase when viewed in the transporting direction 20.

The infeed machine 24 follows the conveyor 21 in the transporting direction 20. The infeed machine 24 shown possesses a loading station which in the exemplary embodiment shown possesses a loading conveyor 27 which in terms of length extends the conveyor cascade 22 of the conveyor 21 in the transporting direction 20, and also possesses two belt conveyors 28 which are disposed so as to lie on top of one another in the manner of a sandwich. The belt conveyors 28 have a width which corresponds to that of the belt conveyors 23, said belt conveyors 28 therefore also being comparatively narrow.

In the case of infeed machines 24 having a plurality of loading stations having, for example, loading conveyors 27, one device according to the invention and/or a downstream conveyor 21 are/is assigned at least to each loading station. In the case of an infeed machine 24 having three preferably identical loading stations that lie beside one another, three devices and three conveyors 21 are in this instance provided ahead of the infeed machine 24 such that each device and each conveyor serves for supplying, specifically feeding, laundry pieces 10 to one loading station of the infeed machine 24.

Alternatively, it is also conceivable for the textile item to be transferred from the device directly to a treatment installation, for example the infeed machine 24, preferably a loading conveyor 27 of the latter.

The device possesses a wall 29 which in the exemplary embodiment shown is vertical. Optionally, the wall 29 can also run so as to be upright with a slight oblique position of the front side 30 of said wall 29. The rectangular wall 29 is preferably disposed so as to be stationary between the preparatory installation 17 of the singularizer 13 and the conveyor 21. The wall 29 can optionally also be displaceable. The upright wall 29 possesses a rectangular base area having upright, longer, longitudinal edges 31 and shorter, horizontal, transverse edges 32. The base area of the front side 30 of the wall 29 is dimensioned such that the largest laundry pieces 10 to be processed can hang in front of said wall 29.

The wall 29 is assigned a vertical rectilinear rail 33 that runs at a minor spacing from and parallel to the left longitudinal edge 31 in the figures, and an oblique rectilinear rail 34. The rails 33 and 34 in the exemplary embodiment shown here are recessed into the wall 29 but are open or exposed, respectively, toward the front side 30 of the wall 29. However, it is also conceivable for the rails 33 and 34 to be fastened to the front side 30 of the wall 29. The obliquely running rail 34 possesses a lower end that lies beside the vertical rail 33, and a higher opposite end. The lower end of the obliquely directed rectilinear rail 34 is situated at, preferably somewhat below, approximately half the height level, of the vertical rail 33. The higher opposite end of the obliquely directed rail 34 is situated in an upper right corner region of the front side 30 of the wall 29. This herein is that side of the wall 29 that is opposite the vertical rail 33.

The clamp 19, already mentioned, is displaceable up and down on a clamp traveler 36 on the vertical rail 33. The clamp 19 is fastened to the clamp traveler 36 so as to be transverse to the oblique rail 34, specifically such that the clamp opening of the clamp 19 is able to be moved up and down at a minor spacing from the front side 30 of the wall 29.

A holding means 37 is displaceable in opposite directions along the obliquely directed rail 34. The holding means 37 possesses two independently operating holding means for the laundry piece 10, specifically a suction head 38 which operates pneumatically with a vacuum, and a mechanical grip 39. The suction head 38 and the gripper 39 are conjointly fastened to a traveler 40 that is displaceable along the rail 34. This fastening takes place in such a manner that the suctioning direction of the suction head 38 and the opening of the gripper 39 run parallel to the wall 29, specifically at a minor spacing from the front side 30 of the wall 29. The suction head 38 as well as the gripper 39 herein are oriented so as to be mutually parallel in such a manner that the suctioning direction of the suction head 38 and the opening of the gripper 39 run parallel to the transverse edges 32 of the wall 29, or to the front side 30 of the latter, respectively. It is also conceivable for the suction head 38 and/or the gripper 39 to be fastened on a common support plate 41 which is rotatable freely and/or driven in a targeted manner about a rotation axis that runs perpendicularly to the plane of the front side 30 of the wall 29 so as to adapt to the orientation of that region of the laundry piece 10 that is to be acquired by the suction head 38 and the gripper 39, in particular locations 42 and 43 of the laundry piece that lie close beside one another.

The device is assigned at least one image-generating installation. This assigning is chosen in such a manner that the image-generating installation is directed onto the front side 30 of the wall 29 so as to deliver an image of at least one part of the laundry piece 10 that hangs in front of the wall 29 and delivers the desired items of information. The at least one image-generating installation preferably serves for detecting the entire laundry piece 10, or at least a majority of the latter, in front of the wall 29 and for generating at least one image of said laundry piece 10. The image-generating installation is preferably a camera 44. The camera 44 can be configured as a black-and-white camera or as a color camera which generates two-dimensional or three-dimensional images.

It is also conceivable for at least one further image-generating installation which can also be configured as a camera to be provided at at least one other location in front of or beside the wall 29. Such an image-generating installation can additionally record at least one image of the laundry piece 10 hanging in front of the wall 29, or desired details of said laundry piece 10, from another viewing direction.

The device moreover possesses a clamp 45, or such a clamp 45 is assigned to the device. This clamp 45 is configured for gripping a portion of the periphery that freely hangs below the clamp 19, wherein this can be a longitudinal periphery 11 or a transverse periphery 12. In the exemplary embodiment shown, a portion 46 of the left longitudinal periphery 11 of the laundry piece 10 that freely hangs from the clamp 19 is gripped by the clamp 45. This portion 46 lies between two end portions 47 and 48 that emanate from adjacent corners of the freely hanging longitudinal periphery 11.

In order for the clamp 45 to be able to grip the inward, or approximately centric, respectively, portion 46 of the periphery of the laundry piece 10 that freely hangs from the clamp 19, said clamp 45 in the device shown is configured as a double clamp having two spaced-apart individual clamps 49. The spacing of the individual clamps 49 corresponds to the length of the portion 46 of the vertically hanging periphery of the laundry piece 10 that is to be acquired by the clamp 45. Alternatively, however, it is also conceivable for the clamp 45 to be configured as an elongate clamp, the clamp opening thereof being so long that the latter extends across the entire portion 46 of the vertically hanging periphery to be gripped, here the longitudinal periphery 11, of the laundry piece 10.

The clamp 45 is disposed on the end of an arm of a handling installation. The handling installation is configured such that the clamp 46 is able to be moved in at least three axes in the three-dimensional space by said handling installation, in particular the arm thereof. It can moreover be provided that the clamp 45 is disposed on the end of the arm of the handling installation so as to be rotatable and/or pivotable in a targeted manner. The handling installation transfers the respective laundry piece 10 from the location where said laundry piece 10 is gripped by the clamp 45 in front of the wall 29 to the depositing region 25 of the conveyor 21 ahead of the infeed machine 24.

The handling installation in the exemplary embodiment shown is configured as a robot 50. Alternatively, the handling installation can also be configured in the manner of a crane.

The movements of the handling installation, in particular of the robot 50, are controlled by means of the image data recorded by the at least one image-generating installation, in particular the camera 44. The movements of the suction head 38 and/or of the gripper 39 can also be controlled by means of the image data supplied by the camera 44 or any other image-generating installation. This also applies to the point in time at which the laundry piece 10 is gripped by the gripper 39 and the suction head 38 is deactivated and/or the holding means 37 is displaced along the oblique rail 34.

A preferred exemplary embodiment of the method having the afore-described device, the singularizer 13, the conveyor 21, and the infeed machine 24 will be described hereunder. It is assumed here that the laundry piece 10 is such a laundry piece which possesses transverse peripheries 12 that are shorter in comparison to the longitudinal peripheries 11, that the laundry piece 10 having a transverse periphery that runs transversely to the transporting direction 20 is pulled onto the depositing region 25 of the conveyor 21, and that the laundry piece 10 hangs from the clamp 29 by way of the (longer) longitudinal periphery 11.

A laundry piece 10 singularized by the singularizer 13 is offered up by the preparatory installation 17 of the singularizer 13 for transfer by the clamp 19 of the device, or the laundry piece 10 is transferred from the preparatory installation 17 to the clamp 19. The handover or the transfer of the laundry piece 10 to the clamp 19 takes place such that the clamp 19 of the device holds the laundry piece in a corner region, in particular a first corner 18. When handing over or transferring the laundry piece 10 to the device, the clamp 19 on the rectilinear vertical rail 33 can assume a position which permits or facilitates, respectively, the handing over or the transfer of the corner 18 of the laundry piece 10 by the clamp 19. If required, the clamp 19 after the transfer of the first corner 18 of the laundry piece 10 is moved upward along the vertical rectilinear rail 19 so far that the laundry piece 10 freely hangs by the first corner 18 that is held in the clamp 19. It is preferably provided that the first clamp 19 for transferring the laundry piece 10 is moved upward to the upper end of the vertical rail 33. In the case of relatively small laundry pieces 10 it is expedient for the clamp to be displaced on the rail 33 only so far that the lower free end of the oblique rail 34 is situated in the center of the laundry piece 10, preferably so as to be approximately level with half the length of the longitudinal periphery 11 of the laundry piece 10 that hangs from the clamp 19.

Once the laundry piece 10 has been gripped by the clamp 19 and is freely suspended below the latter, the laundry piece 10 still forms creases. In this instance, the longitudinal periphery 11 below the clamp 19 is not yet, or not yet sufficiently, configured below the clamp 19. In order for this to be brought about, a reorientation of the laundry piece 10 that is held in the clamp 19 and hangs from the latter by way of the first corner 18 takes place. This reorientation takes place by way of the holding means 37 that is displaceable on the obliquely directed rail 34, initially using the suction head 38 and subsequently the gripper 39.

As long as the laundry piece 10 still hangs freely from the clamp 19, a crease is formed on the longitudinal periphery 11 opposite the longitudinal periphery 11 that emanates from the clamp 19, or the outer longitudinal periphery 11 that points away from the clamp 19 is folded over. On account thereof, the laundry piece 10 here has two tiers. On account of this two-tier characteristic, the reorientation of the laundry piece 10 for freely configuring the longitudinal periphery 11 of the laundry piece 10 that emanates from the clamp 19 and hangs therefrom is at least significantly impeded but is rendered impossible in most cases. The holding means therefore, in addition to the gripper 39, also possesses the suction head 38.

In order for the reorientation of the laundry piece 10 to be prepared, the holding means 37 is moved obliquely downward along the oblique rail 34 until the suction head 38 is moved close to the laundry piece 10. The suction head 38 then acquires the laundry piece 10 at a location 42. This herein can be an arbitrary location 42. In particular, the location 42 does not have to be situated at any corner of the laundry piece 10. The suction head 38 generates only such a vacuum, or is correspondingly configured, such that said suction head 38 suctions and fixes only one tier 51 of the laundry piece 30 but not the adjacent second, or optionally further, tier in the region of a crease or the like of the laundry piece 10.

The single, or preferably outer, tier 51 of the laundry piece 10 that is held by the suction head 38 by way of a vacuum is entrained by subsequently displacing the holding means 37 with the suction head 38 and the gripper 39 in the opposite direction, i.e. obliquely upward along the oblique rail 34, and a first reorientation of the laundry piece 10 is performed here, in particular at least one crease of the laundry piece 10 being at least partially eliminated. A tier 51 of the laundry piece 10 is thereafter gripped by the gripper 39, and the suction head 38 is subsequently deactivated, i.e. the supply of suction air thereto being blocked. The laundry piece 10 is now still held in a clamping manner by the gripper 39 only at the location 42 previously suctioned by the suction head 38, preferably a location 43 adjacent to said location 42. Since the clamping force of the gripper 39 is greater than the suction force of the suction head 38, the laundry piece 10 is further reoriented and preferably pulled apart here by further displacing the holding means 37 with the gripper 39 in an obliquely upward-directed manner along the oblique rail 34, until the longitudinal periphery 11 of the laundry piece 10 is configured below the clamp 19 that holds the first corner 18 of the laundry piece 10 such that said longitudinal periphery 11 at least largely, preferably completely, hangs from the clamp 19 vertically and parallel or in front of the vertical rail 33. This profile is ideally rectilinear but, in particular in the case of laundry pieces 10 composed of a stiff woven fabric, will have a slightly serpentine profile. The longitudinal periphery 11, emanating from the clamp 19, in the center runs in rectilinear, vertical manner and so as to be parallel to the longitudinal edge 31 of the wall 29.

The locations 42 and 43, respectively, where first the suction head 38 and then the gripper 39 of the holding means 37 grip the laundry piece 10 are situated so as to be remote from the first corner 18. It is preferably provided that the holding means 37 and thus the suction head 38 and the gripper 39 acquire the laundry piece 10 at locations 42 and 43, respectively, in the proximity of a second corner 52, this being an adjacent second corner 52 of the upper transverse periphery 12 of the laundry piece 10 that is opposite the first corner 18. It is however not necessary here that the locations 42 and 43, respectively, where first the suction head 38 and then the gripper 39 fix the laundry piece 10 for reorientation, grip exactly at the second corner 52; rather, it is sufficient for the suction head 38 and the gripper 39 to acquire the laundry piece 10 in the proximity of the second corner 52 so as to be able to reorient said laundry piece 10 in the manner described above.

The camera 44 directed onto the laundry piece 10 in front of the wall 29 supplies images which can serve for controlling the displacement path of the clamp 19 and of the holding means 37. The images, or image data, respectively, from the camera 45 can alternatively or additionally however also serve for controlling the opening and closing of the clamp 19 and/or of the suction head 38 and of the gripper 39 of the holding means 37. On account thereof, it can in particular be controlled when the gripper 39 grips the location 43 of the laundry piece 10 and when the suction head 38 releases the location 42 of the laundry piece 10 acquired by said suction head 38.

It is conceivable for the suction head 38 and the gripper 39 of the holding means 37 to be controlled by means of image data that is recorded by a separate camera in the proximity of the holding means 37 or even in the traveler 40 of the holding means 37.

The images of the laundry piece 10, in particular image data of the images, recorded by the at least one camera 44 directed onto the laundry piece 10 and the wall 29 are preferably also used for establishing whether the periphery of the laundry piece 10 that hangs from the clamp 19 is a longitudinal periphery 11 (as assumed in the description above and hereunder) or a transverse periphery 12. The length dimensions of the longitudinal periphery 11 and of the transverse periphery 12 do not have to be exactly determined in order for said longitudinal periphery 11 and said transverse periphery 12 to be determined. It suffices for a qualitative measurement which enables a differentiation between the longitudinal periphery 11 and the transverse periphery 12 to be performed, or which enables it to be established whether both peripheries are of equal length in the case of square laundry pieces 10, respectively. It is conceivable herein for the front side 30 of the wall 29 to be provided with a grid, in particular a chequerboard grid, on account of which the length dimensions of the longitudinal periphery 11 and of the transverse periphery 12 can be determined, and the size of the respective laundry piece 10 can optionally also be determined therefrom by calculation.

The robot 50 or a comparable handling installation for moving the clamp 45 is also controlled by means of the images recorded by the camera 44 and/or the image data thereof, at least for gripping the inward, preferably centric, portion 46 of the longitudinal periphery 11 that hangs from the clamp 19. The opening and closing of the clamp 45 is able to be likewise controlled. The control unit of the robot 50 and of the clamp 45 is supplied with the images or image data, respectively, recorded by the camera 44. The robot 50 then moves the clamp 45 to the inward or centric, respectively, portion 46 of the vertically hanging longitudinal periphery 11 of the laundry piece 10. After the portion 46 has subsequently been gripped by the clamp 45, in particular the spaced-part individual clamps 49 thereof, the first corner 18 is released by opening the clamp 19, and the opposite second corner 52 is likewise preferably released from the gripper 39 of the holding means 37. The laundry piece 10 thereafter hangs from the clamp 45 that is configured as a double clamp or a wide clamp, wherein the central portion 46 of the longitudinal periphery 11 is held stretched between the individual clamps 49 of the clamp 45 or a wide clamp.

The clamp 45 having the laundry piece 10 hanging therefrom is subsequently transferred by the robot 50 or any other handling installation to the conveyor 21 ahead of the infeed machine 24.

Because the clamp 45 in the exemplary embodiment shown holds a central, in particular centric, portion 46 of the longitudinal periphery 11 of the laundry piece 10, the laundry piece 10 in the case of the feeding of the laundry piece 10 having a transverse periphery 12 running transversely to the transporting direction 20 assumed here is pulled across the depositing region 25 of the conveyor 21 transversely to the transporting direction 20, specifically onto the upper lead of the lower front belt conveyor 28 of said conveyor 21, said upper lead being exposed here. For this purpose, the clamp 45 is configured so wide that the portion 46 held by said clamp 45 is somewhat larger than the width of the belt conveyor 28 in the depositing region 25.

If the clamp 45 has gripped an inward portion of a transverse periphery 12 of the laundry piece 10, the robot 50 would move the clamp 45 such that the laundry piece 10 is pulled onto the depositing region 25 of the conveyor 21 in the transporting direction 20, wherein the clamp 45 having the portion 46 of the transverse periphery 12 of the laundry piece 10 that is held by said clamp 45 moves in the transporting direction 20 so as to be centric above the depositing region 25.

The procedure is converse to the one described above when the laundry piece 10 is to be fed to the infeed machine 24 by way of a longitudinal periphery 11 that runs transversely to the transporting direction 20. In this instance, the laundry piece 10 in the case of the longitudinal periphery 11 being gripped by the clamp 45 is pulled onto the depositing region 25 in the transporting direction 20, and the laundry piece 10 in the case of the transverse periphery 12 being gripped by the clamp 45 is pulled across the depositing region 25 transversely to the transporting direction 20.

On account of the laundry piece 10 being pulled onto and across the depositing region 25 of the conveyor 21 in the manner described above, the laundry piece 10, by virtue of the relatively narrow belt conveyors 28 used for forming the conveyor 21, in the depositing region 25 hangs over the front lower belt conveyor 28 in an upside-down U-shaped configuration. At least the inner, preferably central, portion 46 of the laundry piece 10 that was originally held by the clamp 19 here extends across the depositing region 25 of the loading conveyor 27, whereas peripheral portions of the laundry piece 10 that adjoin the portion 46 on both sides hang on both sides from the depositing region 25 of the conveyor 21.

Once the respective laundry piece 10 has been pulled onto the depositing region 25 of the conveyor 21 in the manner described above, the laundry piece 10 by the conveyor 21, in particular by the belt conveyors 28 thereof, is transported in the transporting direction 22 to the infeed machine 24, and herein is preferably stretched in the transporting direction 20 such that the laundry piece 10 which, at least when viewed in the transporting direction 20, is free of creases or at least almost free of creases, is able to be transferred from the conveyor 21 to the respective loading conveyor 27 of the infeed machine 24, specifically in the configuration that now is stretched but still of an upside-down U-shape.

Alternatively, it is conceivable for the laundry piece 10 or another textile item to be transferred by the clamp 19 directly to a treatment machine, for example to the infeed machine 24. This can take place by pulling the respective textile item onto a loading conveyor 27 of the infeed machine 24 by means of the clamp 19.

LIST OF REFERENCE SIGNS

10 Laundry piece
11 Longitudinal periphery
12 Transverse periphery
13 Singularizer
14 Landry piece pile
15 Camera
16 Gripper
17 Preparatory installation
18 First corner
19 Clamp
20 Transporting direction
21 Conveyor
22 Conveyor cascade
23 Belt conveyor
24 Infeed machine
25 Depositing region
27 Loading conveyor
28 Belt conveyor
29 Wall
30 Front side
31 Longitudinal edge
32 Transverse edge
33 Rail
34 Rail
36 Clamp traveler
37 Holding means
38 Suction head
39 Gripper
40 Traveler
41 Support plate
42 Location
43 Location
44 Camera
45 Clamp
46 Portion
47 End portion
48 End portion
49 Individual clamp
50 Robot
51 Position
52 Second corner

What is claimed is:

1. A method for gripping a rectangular textile item,
   wherein the singularized textile item is gripped at one corner (18), the textile item, while configuring regions in which the textile item overlaps so as to form double tiers, hangs freely from this corner (18), and the textile item by a holding means (37) is reoriented so as to configure at least part of a free periphery of the textile item that emanates from the held corner (18),
   wherein the textile item at a spacing from the held corner (18) is pneumatically acquired by a holding means (37) at a location (42), the textile item, while entraining the pneumatically acquired location (42), is initially pulled apart by the holding means (37), the textile item thereafter is gripped in a clamping manner at or in the proximity of the pneumatically acquired location (42), and the textile item by further displacing the holding means (37) while maintaining the clamping hold is further pulled apart until at least part of a periphery of the textile item is configured below the held corner (18),
   wherein the location (42) which initially is pneumatically acquired by the holding means (37) is suctioned by way of a vacuum by a pneumatic suction head (38) of the holding means (37), is subsequently mechanically acquired by the holding means (37), and
   wherein the suction force of the suction head (38) of the holding means (37) is chosen such that in the region in which the textile item hangs from the corner (18) so as to overlap in multiple tiers only one tier (51) of the textile item that points toward the suction head (38) is suctioned and pneumatically held.

2. The method as claimed in claim 1, wherein the holding means (37) upon gripping the textile item is further displaced by the gripper (39) until at least part of the periphery of the textile item that hangs from the corner (18) has been configured.

3. The method as claimed in claim 1, wherein a portion (46) of the periphery of the textile item that has been configured under the corner (18) is gripped by a clamp (45).

4. The method as claimed in claim 3, wherein the portion (46) of the periphery of the textile item that has been configured below the corner (18) and has been gripped by the clamp (45) is pulled by this clamp (45) over a loading conveyor (27) which transports the textile item to a downstream laundry treatment machine.

5. The method as claimed in claim 3, wherein a portion (46) of the periphery of the textile item that has been configured below the corner (18) is gripped by a clamp (45) having a width which corresponds to the length of the portion (46).

6. A method for gripping a rectangular textile item,
   wherein the singularized textile item is gripped at one corner (18), the textile item, while configuring regions in which the textile item overlaps so as to form double tiers, hangs freely from this corner (18), and the textile item by a holding means (37) is reoriented so as to configure at least part of a free periphery of the textile item that emanates from the held corner (18),
   wherein the textile item at a spacing from the held corner (18) is pneumatically acquired by a holding means (37) at a location (42), the textile item, while entraining the pneumatically acquired location (42), is initially pulled apart by the holding means (37), the textile item thereafter is gripped in a clamping manner at or in the proximity of the pneumatically acquired location (42), and the textile item by further displacing the holding means (37) while maintaining the clamping hold is further pulled apart until at least part of a periphery of the textile item is configured below the held corner (18), wherein the textile item is acquired by the suction head (38) of the holding means (37) below the textile item that hangs by the corner (18), and wherein the textile item is pulled apart by the suction head (38) of the holding means (37) by laterally displacing the textile item while entraining the location (42) which is held by the suction head (38), in such a manner that the pneumatically fixed tier (51) of the textile item is exposed at least at the pneumatically held location (42), in that said tier (51) is not overlapped by any adjacent tier.

7. A method for gripping a rectangular textile item, wherein the singularized textile item is gripped at one corner (18), the textile item, while configuring regions in which the textile item overlaps so as to form double tiers, hangs freely from this corner (18), and the textile item by a holding means (37) is reoriented so as to configure at least part of a free periphery of the textile item that emanates from the held corner (18), wherein the textile item at a spacing from the held corner (18) is pneumatically acquired by a holding means (37) at a location (42), the textile item, while entraining the pneumatically acquired location (42), is initially pulled apart by the holding means (37), the textile item thereafter is gripped in a clamping manner at or in the proximity of the pneumatically acquired location (42), and the textile item by further displacing the holding means (37) while maintaining the clamping hold is further pulled apart until at least part of a periphery of the textile item is configured below the held corner (18), and wherein, upon pulling apart the textile item, the textile item is mechanically gripped by the gripper (39) of the holding means (37) at the location (42) that is held by the suction head (38) of the holding means (37), and the suction head (38) is thereafter released from the textile item.

8. A method for gripping a rectangular textile item, wherein the textile item hanging from a clamp (18) that holds a corner (18) is reoriented so as to form at least part of a freely hanging periphery of the textile item that emanates from the held corner (18), wherein the textile item is reoriented from the held corner (18) thereof in the state hanging in front of a wall (29) by a holding means (37) that acquires at least one location (42, 43) of the textile item, and displacing of said holding means (37) so as to configure at least part of a periphery of the textile item hanging in front of the wall (29) that emanates from the corner (18), and gripping of a portion (46) of the periphery of the textile item hanging in front of the wall (29).

9. The method as claimed in claim 8, wherein the textile item is reoriented in front of the upright wall (29).

10. The method as claimed in claim 8, wherein the textile item is reoriented in front of the upright wall (29), and the wall (29) is stationary during the reorientation of the textile item.

11. The method as claimed in claim 8, wherein the wall (29) has a color which deviates at least from the color of the textile item.

12. A method for feeding rectangular textile items to a treatment installation, wherein a respective singularized textile item is gripped at a portion (46) of a periphery and pulled onto or over a conveyor (21) of the treatment installation that transports the textile item to the treatment installation, wherein in the case of a textile item having peripheries of unequal length it is determined before or after gripping the portion (46) of the periphery of the textile item whether this is a portion of a short or a long periphery, and as a function of the result of this determination, the textile item by way of the gripped portion (46) of its periphery is pulled onto the conveyor (21) in a targeted manner so as to be transverse or longitudinal on said conveyor, wherein it is determined with the aid of at least one image-generating installation whether the portion (46) of the gripped periphery of the textile item that is acquired by the clamp (45) is a long periphery or a short periphery.

13. The method as claimed in claim 12, wherein when the textile item is to be pulled onto the conveyor (21) or the loading conveyor (27) by way of the short periphery running transversely to the transporting direction (20), and the periphery of the textile item that is gripped by the clamp (45) is a short periphery, the clamp (45) pulls the textile item onto the conveyor (21) so as to be longitudinal in the transporting direction (20), whereas, in the case of the portion (46) of the long periphery being held by the clamp (45), the textile item is pulled over the conveyor (21) or the loading conveyor (27) transversely to the transporting direction (20) of the latter.

14. A device for gripping rectangular textile items, having a clamp (19) for holding a corner (18) of the textile item, and a clamp (45) for acquiring a portion of at least part of a periphery of the textile item that hangs from the corner (18), wherein the clamp (19) that holds the corner (18) of the textile item is assigned a displaceable holding means (37) for reorienting the textile item, wherein the holding means (37) is displaceable along an oblique path, wherein the holding means (37) has a suction head (38) and a gripper (39), wherein the clamp (19) is displaceable along a vertical path, and an end of the oblique path of the holding means (37) that points toward the vertical path of the clamp (19) lies below an opposite end of the oblique path, and wherein the vertical path of the clamp (19) and the oblique path of the holding means (37) are disposed on a wall (29) in front of which the respective textile item hangs from the clamp (19).

15. A device for gripping rectangular textile items, having a clamp (19) for holding a corner (18) of the textile item, and a clamp (45) for acquiring a portion of at least part of a periphery of the textile item that hangs from the corner (18), wherein the clamp (19) that holds the corner (18) of the textile item is assigned a displaceable holding means (37) for reorienting the textile item, wherein the holding means (37) is displaceable along an oblique path, wherein the holding means (37) has a suction head (38) and a gripper (39), wherein the clamp (19) is displaceable along a vertical path, and an end of the oblique path of the holding means (37) that points toward the vertical path of the clamp (19) lies below an opposite end of the oblique path, and wherein the vertical path of the clamp (19) and the oblique path of the holding means (37) are disposed on a wall (29) in front of which the respective textile item is able to be reoriented by the holding means (37).

16. A device for gripping rectangular textile items, having a wall (29) that is assigned at least one image-generating installation, having a clamp (19) for holding a corner (18) of the textile item, and having a clamp (45) for acquiring a portion of at least part of a periphery of the textile item that hangs from the corner (18), wherein the clamp (19) that holds the corner (18) of the textile item is assigned a displaceable holding means (37) for reorienting the textile item.

17. The device as claimed in claim 16, wherein the wall (29) is assigned at least one image-generating installation in such a manner that the at least one image-generating installation is directed onto at least part of the textile item in front of the wall (29), and image data from which it can be determined whether a short or a long periphery of the textile item hangs from the clamp (19) is able to be generated by the at least one image-generating installation.

18. The device as claimed in claim 16, wherein the wall (29) is assigned at least one image-generating installation in such a manner that image data from which it can be determined whether a short or a long periphery of the textile item hangs from the clamp (19) is able to be generated by the at least one image-generating installation.

\* \* \* \* \*